United States Patent [19]

Nakajima et al.

[11] Patent Number: 5,442,777
[45] Date of Patent: Aug. 15, 1995

[54] FIRMWARE TRACE DATA ACQUISITION METHOD

[75] Inventors: Ryoetsu Nakajima; Naomi Yamazaki; Takumi Maruyama; Kiyoshi Sugita, all of Kawasaki, Japan

[73] Assignee: Fujitsu Limited, Kawasaki, Japan

[21] Appl. No.: 201,808

[22] Filed: Feb. 25, 1994

[30] Foreign Application Priority Data

Sep. 20, 1993 [JP] Japan .................................. 5-233566

[51] Int. Cl.[6] .............................................. G06F 11/00
[52] U.S. Cl. ........................... 395/182.18; 395/183.06; 395/183.1; 395/183.14; 395/375; 395/700
[58] Field of Search ................. 395/575, 200; 371/19, 371/29.1, 57.2, 62, 16.5

[56] References Cited
U.S. PATENT DOCUMENTS 3,707,725 12/1972 Dellheim ................................ 371/19
4,455,624 6/1984 Haag et al. ...................... 395/575 X
4,479,197 10/1984 Haag et al. ............................ 395/159

*Primary Examiner*—Robert W. Beausoliel, Jr.
*Assistant Examiner*—Ly V. Hua

[57] ABSTRACT

A firmware trace data acquisition method is constituted such that there are provided a monitoring part for monitoring firmware processes and a DMA part for transferring data to a trace data storing part in accordance with an instruction from the monitoring part, such that labels are attached to the plurality of process modules stored in a firmware storing part, and such that each of the process modules activated notifies the monitoring part of the label attached to itself. The monitoring part latches the label that it is notified of and monitors the execution of the corresponding process such that, when an abnormality is detected during the execution, the monitoring part controls the DMA part so as to transfer detailed data, derived from the process module corresponding to the label latched, to the trace data storing part, and such that, when there is no abnormality detected, the monitoring part allows the DMA part to transfer the latched label to the trace data storing part.

5 Claims, 9 Drawing Sheets

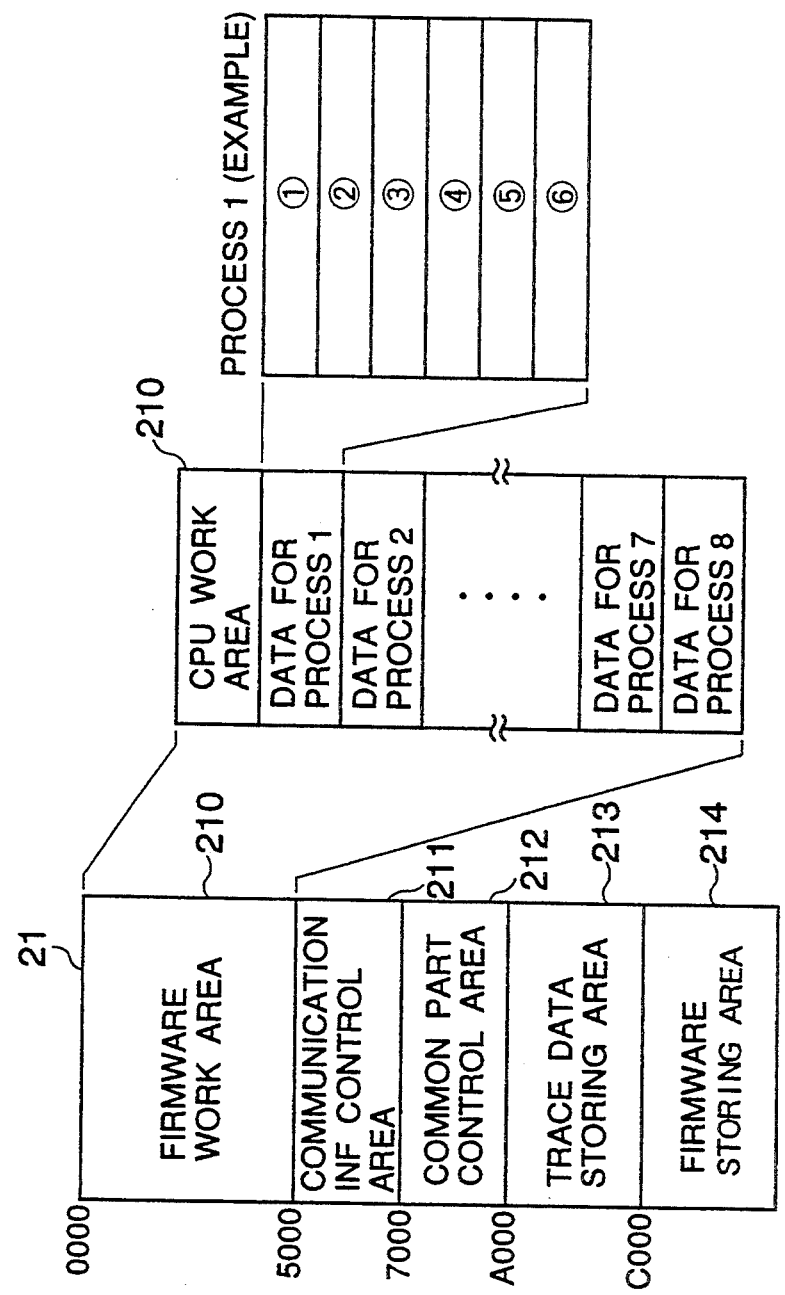

FIG. 8

| |
|---|
| DATA INDICATING WHETHER OR NOT PROCESS HAS BEEN ACTIVATED FROM WITHIN PRECEDING PROCESS |
| DATA RELATING TO FACTORS RELEVANT TO ACTIVATION FROM WITHIN PRECEDING PROCESS |
| HARDWARE SETTING INFORMATION A |
| HARDWARE SETTING INFORMATION B |
| : |
| INFORMATION N RECEIVED FROM HARDWARE |
| INFORMATION N+1 RECEIVED FROM HARDWARE |
| : |

FIG. 9

5000
| |
|---|
| COM. INF / RESET |
| COM. INF / SPECIFY TRANSMISSION MODE |
| COM. INF / SPECIFY TRANSMISSION SPEED |
| : |
| COM. INF / SPECIFY RECEPTION MODE |
| COM. INF / SPECIFY RECEPTION SPEED |
| : |
| INDICATOR OF TRANSMISSION STATE |
| INDICATOR OF RECEPTION STATE |

6FFF

FIG. 10

7000
| | |
|---|---|
| CPU RELATED | ① |
| DMA RELATED | ② |
| MEM RELATED | ③ |
| MONITORING PART RELATED | ④ |

9FFF

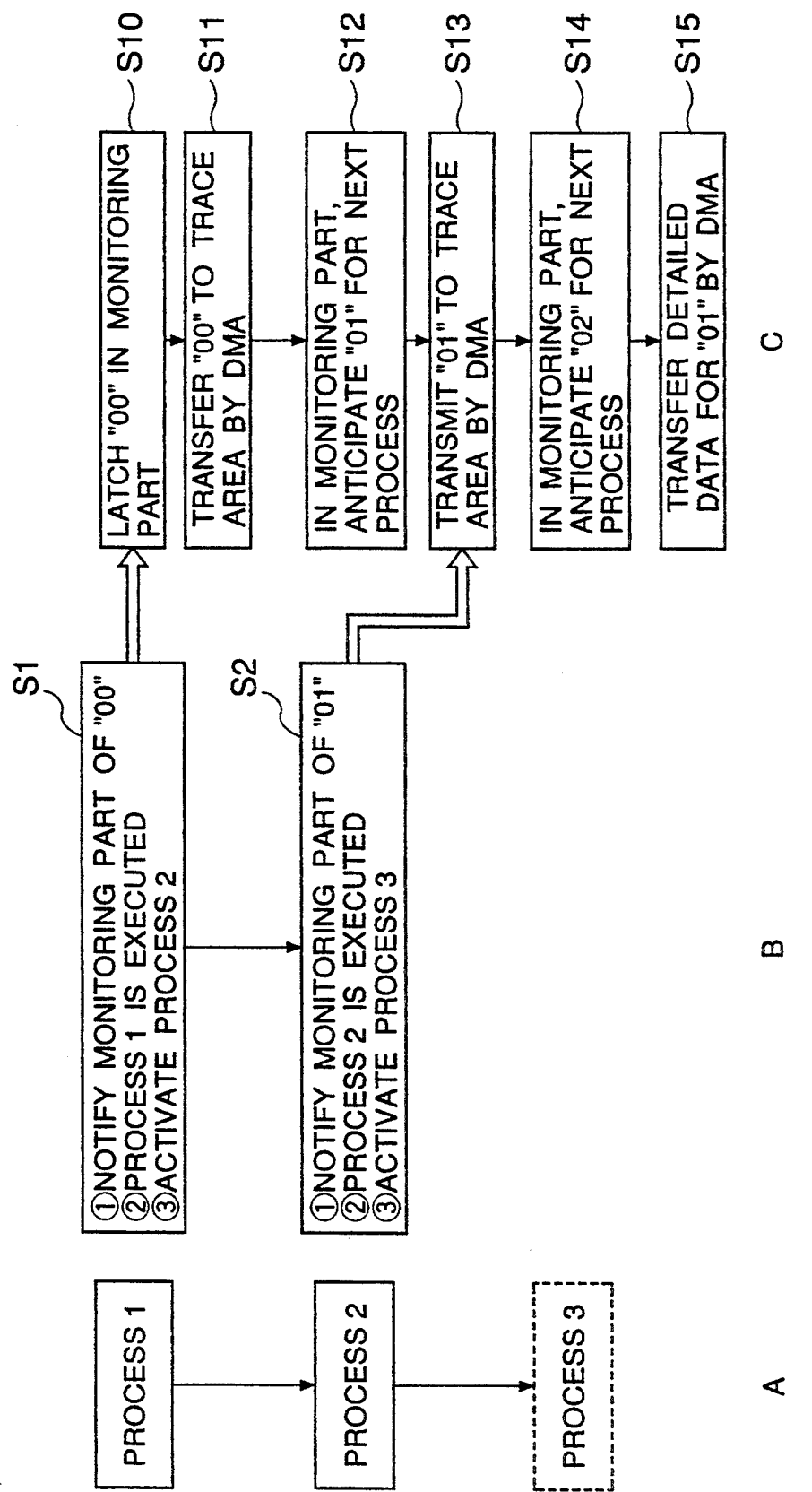

FIG. 13A

NORMAL

| 00 (LABEL) |
|---|
| 01 (LABEL) |
| 02 (LABEL) |
| 03 (LABEL) |
| |
| |
| |

FIG. 13B

ABNORMAL

| 00 (LABEL) |
|---|
| 01 (LABEL) |
| DATA INDICATING WHETHER OR NOT PROCESS HAS BEEN ACTIVATED FROM WITHIN PRECEDING PROCESS |
| DATA RELATING TO FACTORS RELEVANT TO ACTIVATION FROM WITHIN PRECEDING PROCESS |
| RESULT OF ANALYSIS OF FACTORS RELEVANT TO ACTIVATION |
| RESULT OF EXECUTION |
| DATA RELATING TO FACTORS RELEVANT TO ACTIVATION OF NEXT PROCESS |
| INSTRUCTION TO ACTIVATE NEXT PROCESS |
| |
| |

FIRMWARE TRACE DATA ACQUISITION METHOD

BACKGROUND OF THE INVENTION

The present invention relates to a firmware trace data acquisition method in communication control processors.

Recently, with the development of microcomputers, many communication control processors are equipped with microcomputers capable of analyzing communicated information and of effecting communication control. It is a general practice to equip a communication control processor with a trace function and with the function of acquiring data traced by firmware (simply referred to as the firmware trace data or the trace data in this specification) when carrying out debugging in a communication control processor or when an abnormality has occurred during an online service and the cause thereof is to be determined.

However, problems have been encountered in that the communication control processor equipped with a trace function has reduced processing power as compared with the communication control processor not so equipped, and in that it is difficult to examine the cause of an abnormality because there has been no distinction between the trace data acquired in a normal operation and those acquired in an abnormal operation. Hence, there is a need for a firmware trace data acquisition method in which the processing power of the communication control processor is not reduced, and which is capable of acquiring, in addition to the trace data acquired in a normal operation, more detailed firmware trace data in the case of an abnormal operation than in the case of a normal operation.

FIG. 1 shows the constitution of a conventional communication control processor comprising a CPU part 80 having a microprocessor mounted therein, and a memory part (hereinafter, referred to as MEM) 81 which stores a program (firmware) for executing communication control processes. The MEM 81 is segmented into a firmware (program) storing part, a work area required when the firmware is being executed, an I/O control area and a trace data storing area which is not included in the communication control processor lacking a trace function. A communication interface part (a communication INF part) 83 is a hardware unit for performing, in accordance with a predetermined communication protocol, communication between a transmitting communication unit and a receiving communication unit that are at the respective ends of a communication circuit. Communication is performed after communication parameters have been set by means of the program.

A DMA (direct memory access) part 82 shown in FIG. 1 transfers communicated data (transmitted data, received data, communication control data etc.) between the communication interface 83 and the MEM 81 by direct memory access which does not involve the program, that is the CPU. Settings are made in the DMA part 82 so that such a transfer can be carried out.

In the communication control processor in which the communication is controlled by means of firmware as shown in FIG. 1, the memory allocation and the process module configuration of the firmware are arranged to incorporate a trace function. Conventionally, the following two types of trace method are employed.

FIGS. 2A and 2B explain conventional trace methods.

FIG. 2A shows a method in which each processing program includes a trace program. It will be noted that a program for a process 1 is composed of a number of steps (STEP 1, STEP 2 ... ) and that there is provided a trace program at the end of the steps. A process 2 is also composed of steps and a trace program is provided at the end thereof. FIG. 2B shows another method in which individual processing programs do not include a trace program, and a trace program is provided in the form of a trace process call program (noted in the figure as a trace call). The trace process call program is called every time each of the individual processing programs is completed so that a trace process is executed.

FIG. 3 illustrates how data are stored in a conventional trace area (memory area reserved for trace data). In either of the above-mentioned conventional trace methods, the trace program is executed after each process, whereby the trace program places under its control trace items selected by the program from among a number of trace items in the work area of the firmware so as to produce detailed data. The detailed trace data thus obtained are stored in the trace area of the memory. This process of storing the trace data is executed by the CPU 80 by using an appropriate program.

Referring to FIG. 3, when the process 1 is completed, the trace program is activated so that the trace data corresponding to all the selected trace items, that is the trace data 1, the trace data N ... the trace data N+1 are sequentially stored in the trace area of the memory. The trace data for the process 2, the process 3 ... are stored in a similar manner each time any of the processes is completed. Since the trace area of the memory occupies a certain predetermined amount of memory (for example, on the order of mKB, i.e. megakilobyte), old trace data are overwritten by new trace data when the trace area has become full.

The aforementioned problems associated with the conventional communication control processor are elaborated upon as follows:

① The conventional trace is concerned with all the trace items prescribed when the program was originally made. Hence, there is required a relatively long time for the execution of each process because the trace facilities corresponding to all the trace items are activated even when the program is operating normally.

② When there are a large number of trace items, the time allotted to the execution of communication control processes becomes shorter than the time allotted to trace processes, thereby limiting the ordinary processing performance of the processor to only half of its capability.

③ Since the trace data for all the prescribed trace items are stored in the trace area, irrespective of the (normal or abnormal) condition of operation of the communication control processor, all the detailed data must be sequentially consulted in order to track the cause of any abnormality, thereby reducing the efficiency of inspection to be undertaken in a debugging process or in the case of an abnormality.

SUMMARY OF THE INVENTION

Accordingly, an object of the present invention is to acquire trace data for normal operation as well as trace data for abnormal operation, without reducing the ordinary processing performance of the communication control processor when firmware trace data are used to perform debugging or to analyze the cause of an abnormality occurring during an online operation. Another object of the present invention is to obtain more detailed trace data in an abnormal operation than in a normal operation.

FIG. 4 shows the principle of the present invention wherein there are included: a processing unit 1; a detailed data storing part 2 for storing detailed data derived from each process module in firmware; a firmware storing part 3 for storing a plurality of process modules respectively corresponding to the process 1, the process 2 . . . , label data 3a being attached to each of the process modules; a trace data storing part 4 for storing trace data; a monitoring part 5; and a DMA (direct memory access part) 6 equipped with the function of transferring trace data.

The monitoring part 5 includes a label latch part 5a, an abnormality detection part 5b, a label transfer part 5c and a detailed information transfer part 5d.

The present invention is configured such that a label is attached to each process module of the firmware after the execution of a module is completed, and a determination of abnormality is given when a label that is due based on a predetermined execution sequence is not detected while monitoring the execution sequence by means of labels. Detailed data comprising parameters and control information of the process module active at the time of the detection of the abnormality are transferred from a predetermined area to the trace data storing area by direct memory transfer.

Each time the processing unit 1 activates one of the process modules in the firmware storing part 3, the processing unit 1 notifies the monitoring part 5 of the label (number or symbol) indicating the activated module. The monitoring part 5 latches the label in the label latch part 5a, whereupon the abnormality detection part 5b of the monitoring part 5 monitors for input of the label indicating the module to be activated next. Each module stores the detailed data, either at the time of activation, during execution, or at the time of termination, to the corresponding area in the detailed data storing part 2. When the process of a process module is properly executed, the next process module in the sequence is activated, whereupon the monitoring part 5 is notified of the label of the activated module. In a normal operation, the abnormality detection part 5b determines that no abnormality has occurred since the label input thereto is the label that is due based on the predetermined execution sequence. The abnormality detection part 5b then drives the label transfer part 5c. The DMA part 6 transfers the label latched in the label latch part 5a to the trace data storing part 4.

When a label is not input in accordance with the predetermined sequence, the abnormality detection part 5b determines that an abnormality has occurred and activates the detailed information transfer part 5d. Upon being activated, the detailed information storing part 5d sets control data so as to instruct the DMA part 6 to transfer the detailed data for the module indicated by the label transferred last, to the trace data storing part 4. The DMA part 6 then carries out the corresponding transfer.

In this way, the trace data storing part 4 stores a small amount of data, i.e. the labels when the operation is normal and stores detailed data when the operation is abnormal.

While, in the above configuration, the abnormality detection part 5 gives a determination of an abnormality when the labels are not input in the predetermined sequence, an alternative configuration may be employed in which a timer is started when a label is input, and a determination of abnormality is given when the next label is not input within a predetermined period of time set by the timer. Both the scheme based on the label sequence and the scheme using timer may be conducted together, or one of the two schemes is conducted on its own.

BRIEF DESCRIPTION OF THE DRAWINGS

Other objects and further features of the present invention will be apparent from the following detailed description when read in conjunction with the accompanying drawings, in which:

FIG. 7A shows a memory allocation of a memory part;

FIG. 7B shows a data structure of a firmware work area;

FIG. 7C shows a data structure of process 1 data;

FIG. 8 shows another example of the data structure of the firmware work area;

FIG. 9 shows a data structure of a communication INF control area;

FIG. 10 shows a data structure of a common part control area;

FIG. 12 shows an operational flow when an abnormality is encountered; and

FIG. 13A and 13B show examples of trace data.

DETAILED DESCRIPTION OF THE PREFERRED EMBODIMENT

Figure 5:
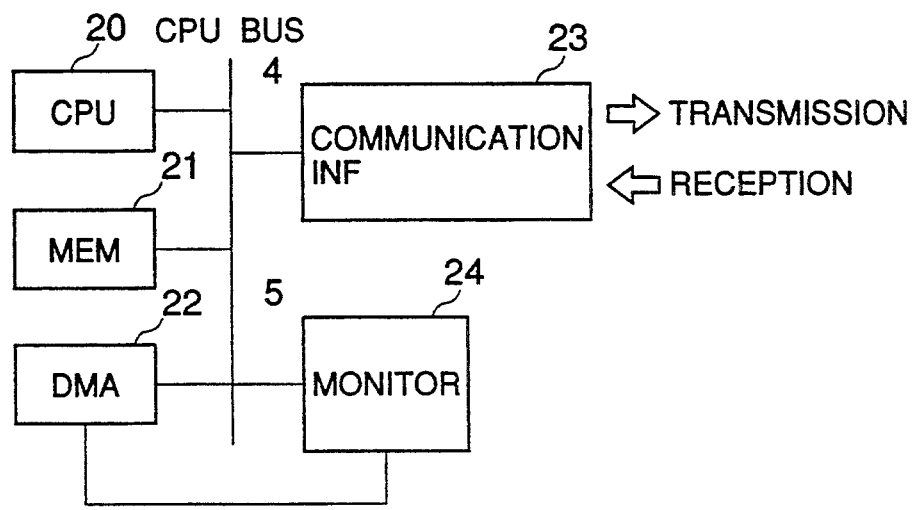
FIG. 5 shows a hardware configuration of an embodiment of the present invention.

FIG. 5 shows a hardware configuration of the communication control processor according to an embodiment of the present invention. The communication control processor of FIG. 5 comprises a CPU part 20 having a microprocessor built therein, a memory part (MEM) 21, a DMA part 22, a communication interface (communication INF) part 23 and a monitoring part 24.

The communication control processor shown in FIG. 5 differs in terms of hardware configuration from the conventional communication control processor in that the monitoring part 24 is provided, and in that the DMA part 22 is driven by the monitoring part 24 so as to transfer trace data.

Figure 6:
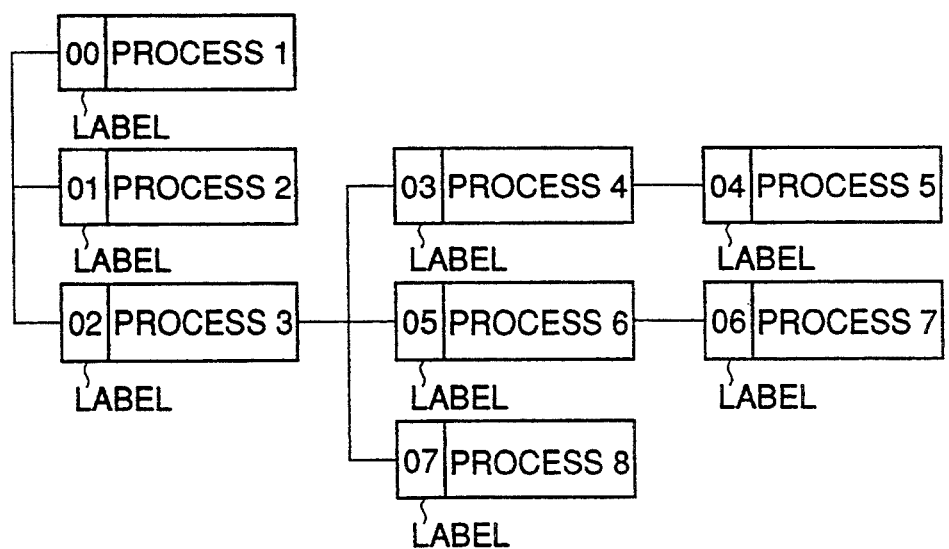
FIG. 6 shows a firmware process module configuration.

FIG. 6 shows a process module configuration of firmware stored in the memory part 21. It will be noted that a label is attached to each module such that a label "00" is attached to the process 1 module, a label "01" is attached to the process 2 module, and a label "02" is attached to the process 3 module. The other processes 4, 5, 6, 7 and 8 are also provided with corresponding labels, and the label numbers denote the order of processes.

FIGS. 7A, 7B and 7C show examples of memory allocation. Referring to 7A, the memory (the memory part 21 of FIG. 5) is segmented into five areas in this example. It is to be noted that different microprocessors have different address spaces, and that the size of individual memory areas differs from one to another because of different equipment associated therewith.

Figure 1:
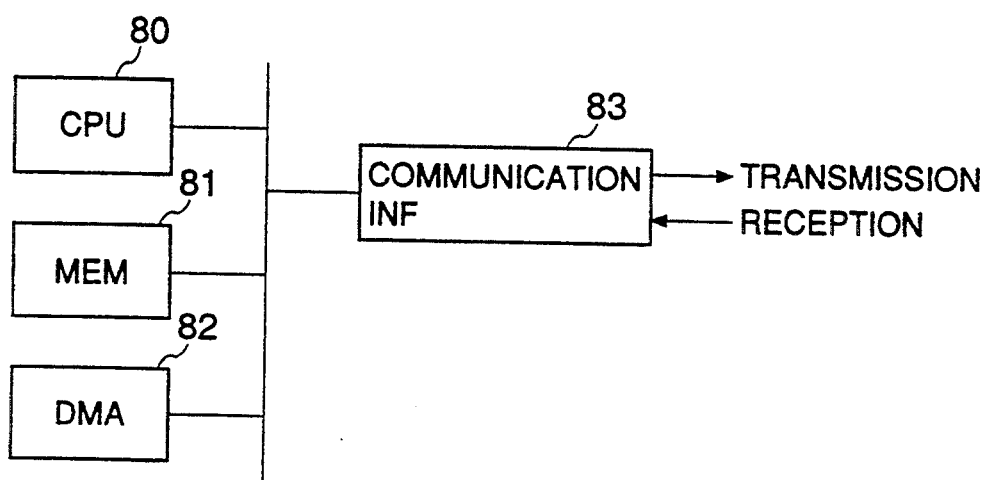
FIG. 1 shows the constitution of a conventional communication control processor.
Figure 2A:
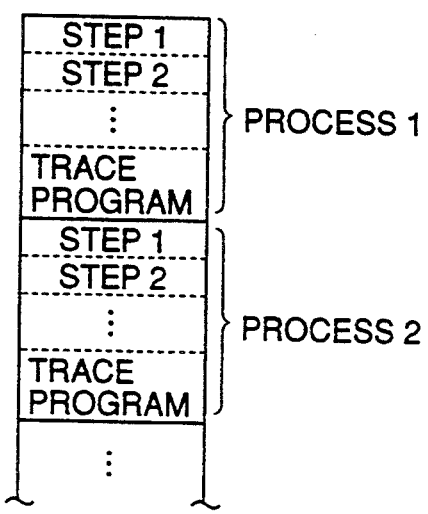
FIGS. 2A and 2B illustrate conventional trace methods.
Figure 2B:
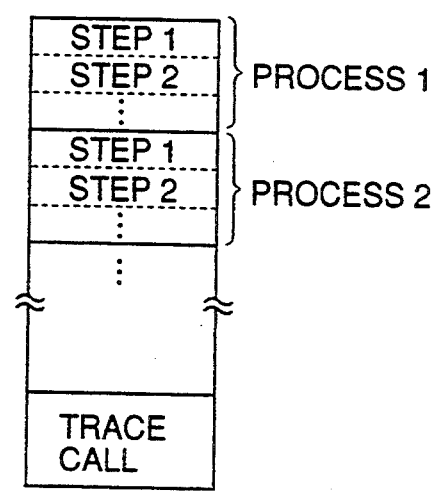
Figure 3:
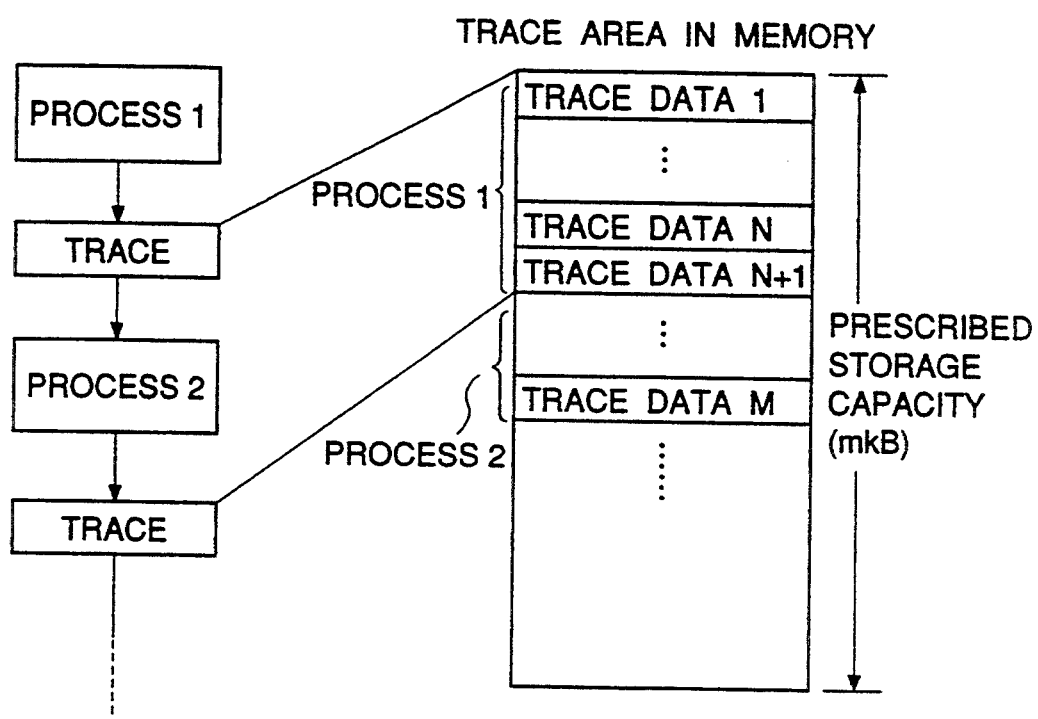
FIG. 3 illustrates how data are stored in a conventional trace area.
Figure 4:
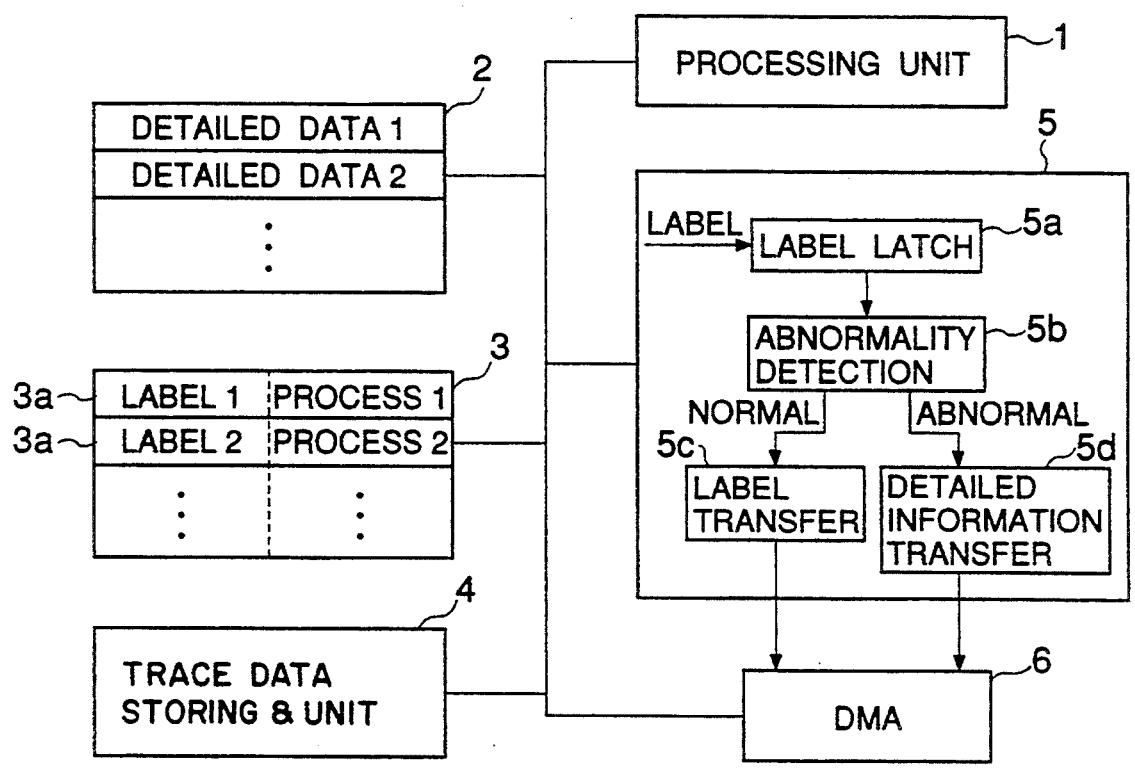
FIG. 4 shows the constitution of the present invention.

In this example, a firmware work area (corresponding to the detailed data storing part 2 of FIG. 4) 210, a communication interface (INF) control area 211, a common part control area 212, a trace data storing area 213 (corresponding to the trace data storing part 4 of FIG. 4) and a firmware storing area 214 for storing the firmware having the process module configuration as shown in FIG. 6 are assigned respective addresses as shown in the figure.

The firmware work area 210 has a data structure as shown in FIG. 7B. A CPU work area, and areas reserved for data derived from processes of individual modules in the firmware area 214 (the data for the process 1, the data for the process 2 etc.) are assigned respective portions of the firmware work area 210. The firmware work area 210 is also used as an area in which control parameters and hardware setting information, which parameters and information are necessary when any of the modules is executed, are temporarily stored.

FIG. 7C shows an example of the use of the area reserved for the data (detailed data) derived from the process 1. Referring to FIG. 7C, ① denotes data indicating whether or not the process has been activated from within the preceding process; ② denotes data relating to the factors relevant to the activation from within the preceding process; ③ denotes the result of the analysis of the factors relevant to the activation; ④ denotes the result of the execution of the process 1 itself; ⑤ data relating to the factors relevant to the activation of the next process; and ⑥ denotes an instruction to activate the next process.

FIG. 8 shows another example of the use of the area reserved for the detailed data. The detailed data such as those shown in FIG. 8 are stored in those areas of the firmware reserved for a module which sets information in hardware or which receives information from hardware. It will be noted that the data structure of FIG. 8 differs from that of FIG. 7C in that there are included data such as hardware setting information A, hardware setting information B, ... information N received from hardware, information N+1 received from hardware... . etc.

FIG. 9 shows a data structure of the communication interface (INF) control area.

The communication INF control area 211 is designed for communication interface hardware setting. When the hardware setting which uses the work area as shown in FIG. 8 is activated, the hardware setting information A, the hardware setting information B etc. are written into addresses assigned to the communication INF control area 211 so that the communication INF hardware can start operating. The communication INF control area 211 is also designed to indicate results of the operation of the communication INF hardware. The information in the communication interface control area is written into the firmware work area 210, as the received information N and the received information N+1 as indicated in FIG. 8.

FIG. 10 shows a data structure of the common part control area.

The common part control area 212 is designed to store hardware setting information of the common hardware shared among facilities of the processor, and to indicate the status of the common hardware. Information relating to operational mode setting is stored in a CPU related area ①; the count of transferred data, information relating to transfer source address setting and information relating to the completion of a transfer are stored in a DMA related area ②; information relating to memory parity check and information relating to the occurrence of errors are stored in a MEM related area ③; an instruction for setting an abnormality detection mode, the sequence of the processes (the normal sequence of processes each assigned a label) and information for setting the value of a monitoring timer are stored in a monitoring part related area ④.

It will be noted, by referring to FIG. 7A, that the trace data storing area 213 is assigned addresses starting at A000(H) and ending at BFFF(H), sufficient for approximately 8 K bytes of trace data. It is also to be noted, by referring to FIG. 7A, that the firmware work area 210 is assigned a memory amount of about 20 K bytes. It may be considered that the 8 K bytes of the trace data area 213 is not enough to store data derived when the 20 K byte data in the firmware work area 210 are subjected to all the firmware processes effected by the process modules. However, when the processor according to the present invention is operating normally, only the labels of process modules are stored as trace data, and only when an abnormality is detected, information, in the firmware work area, corresponding to the active module is stored as trace data. Accordingly, there is required a relatively small amount of memory to store the trace data.

Figure 11:
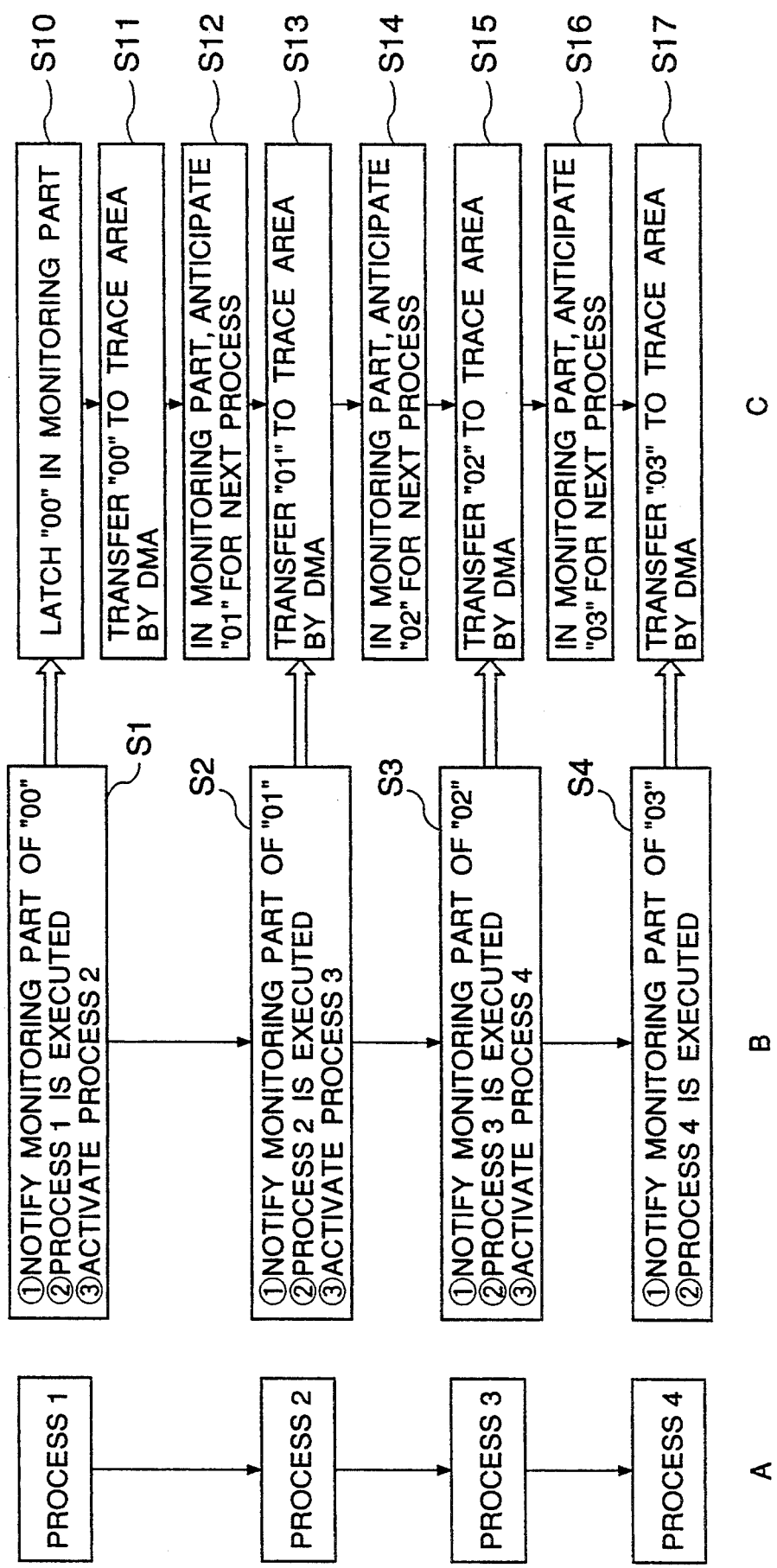
FIG. 11 shows an operational flow when a processor is operating normally.

FIG. 11 is a flowchart applicable when a normal operation is taking place; FIG. 12 is a flowchart applicable when an abnormality is detected; FIGS. 13A and 13B show examples of trace data.

A of FIG. 11 shows the order of execution of modules in the firmware; B of FIG. 11 shows the contents of processes executed by the CPU part 20; C of FIG. 11 shows the contents of processes executed by the monitoring part 24.

When the firmware module for the process 1 is activated, the CPU part 20 instructs the steps of the process 1 collectively indicated as S1 to be carried out. In a normal operational flow, the module for the process 1, upon being activated, notifies the monitoring part 24 of the label "00" indicating the module itself ((①)), whereupon the process 1 is executed ((②)). When the process 1 is completed, the process 1 activates the process 2 ((③)).

Upon receiving the notification, the monitoring part 24 latches the label "00" (S10 of C of FIG. 11). Thereafter, the label "00" is transferred to the trace data storing area 213 (trace area) by means of the DMA part 22 (S11). The monitoring part 24 anticipates the input of the label "01" for the process to be executed next (S12).

When the process 2 is started, steps ① through ③ are executed in the same manner as the process 1. The monitoring part 24, upon receiving the label "01" from the CPU part 20, transfers the label "01" to the trace area by means of the DMA part 22 (S13), and anticipates the label "02" for the process to be performed next. Thereafter, as the processes 3 and 4 are executed in a normal manner, steps S14, S15, S16 and S17 are executed accordingly in the monitoring part 24, in the stated order.

The normal execution of the processes as shown in FIG. 11 results in the labels (numbers) being sequentially stored in the trace data storing area, as shown in FIG. 13A.

A description will now be given, with reference to FIG. 12, of the flow of processes executed in the case in which an abnormal operation has occurred.

A of FIG. 12 shows the order of execution of modules in the firmware; B of FIG. 12 shows the contents of processes executed by the CPU part 20; C of FIG. 12 shows the contents of processes executed by the monitoring part 24.

In this example, it is assumed that an abnormality is detected after the processes 1 and 2 have been normally executed in a manner as described with reference to FIG. 11. Specifically, it is assumed that, when the process 2 is activated after the completion of the process 1 (S2 of B of FIG. 12), the monitoring part 24 is notified of the label "01" (step ① of S2), the process 2 is executed (② of S2), and the process 3 is activated from within the process 2 (③ of S2). The monitoring part 24, upon receiving the label "01", transfers the label "01" to the trace area (S11), and anticipates the label "02" for the process to be executed next. When the monitoring part 24 determines, after a predetermined period of time, that it has not received the label "02", a determination of abnormality is given. The monitoring part 24 then transfers the detailed data corresponding to the label "01" from a portion of the firmware work area 210, which portion corresponds to the process 2, to the trace data storing area, by means of the DMA 22.

FIG. 13B shows an example of the content stored in the trace data storing area when an abnormality has occurred as described above with reference to FIG. 12.

As has been described above, the present invention ensures that, while the processor is operating normally, labels attached to the process modules in the firmware are sequentially stored as trace data, and that, when an abnormality is detected, only the detailed data associated with the module active at the time of the detection is stored as trace data so that unnecessary trace acquisition is eliminated. Another feature of the present invention is that, since direct memory access transfer is employed in storing trace data, the processing performance of the firmware is not inhibited. Accordingly, the following merits will be appreciated; it becomes possible to reduce the amount of memory to be reserved for trace data; debugging processes become more efficient; abnormality analysis is facilitated; an abnormality can be dealt with in a timely manner.

The present invention is not limited to the above described embodiments, and variations and modifications may be made without departing from the scope of the present invention.

What is claimed is:

1. A firmware trace data acquisition method in a communication control processor for carrying out communication control by using firmware composed of a plurality of process modules, said firmware trace data acquisition method comprising the steps of:

providing said plurality of process modules with module identifier labels;

monitoring the execution of firmware processes by acquiring said module identifier labels attached to said plurality of process modules and detecting whether or not there is any abnormality during said execution of firmware processes;

providing a Direct Memory Access (DMA) part, a detailed data storing part, and a trace data storing part; and controlling said DMA part to transfer data to said trace data storing part in accordance with a result of said detecting from said monitoring step, wherein when an abnormality is detected during the execution of any of the process modules, detailed data derived from the process module which is then active and whose module identifier label is latched are transferred from said detailed data storing part to said trace data storing part and wherein when there is no abnormality detected, said latched module identifier label corresponding to the active process module is transferred to said trace data storing part.

2. The firmware trace data acquisition method as claimed in claim 1, wherein a determination of an abnormality is given in said monitoring step when it is detected that the module identifier label acquired in said monitoring step is different from the module identifier label that is due in accordance with a predetermined sequence.

3. The firmware trace data acquisition method as claimed in claim 1, wherein a determination of an abnormality is given in said monitoring step when it is detected that, after a module identifier label has been acquired in said monitoring step, the next module identifier label is not acquired within a predetermined period of time.

4. The firmware trace data acquisition method as claimed in claim 1, wherein said DMA part transfers, when an abnormality has been detected, the following items of detailed data stored in said detailed data storing part, to said trace data storing part: data indicating whether or not a process has been activated from a preceding process, data relating to factors relevant to an activation from the preceding process, a result of analysis of factors relevant to the activation, a result of execution, and an instruction to activate the next process.

5. The firmware trace data acquisition method as claimed in claim 1, wherein said trace data storing part sequentially stores module identifier labels of the process modules while a normal operation is being carried out, and wherein when an abnormality has been detected, said trace data storing part stores, in addition to the module identifier labels of the process modules, the detailed data from the process module in which the abnormality has occurred.

* * * * *